I. J. PONSTEIN.
FAN.
APPLICATION FILED AUG. 24, 1920.
1,418,165.
Patented May 30, 1922.
2 SHEETS—SHEET 1.
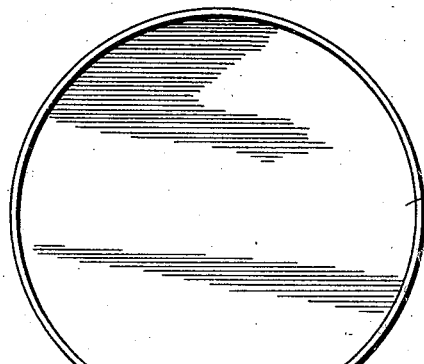
Fig 1.
Fig 4.
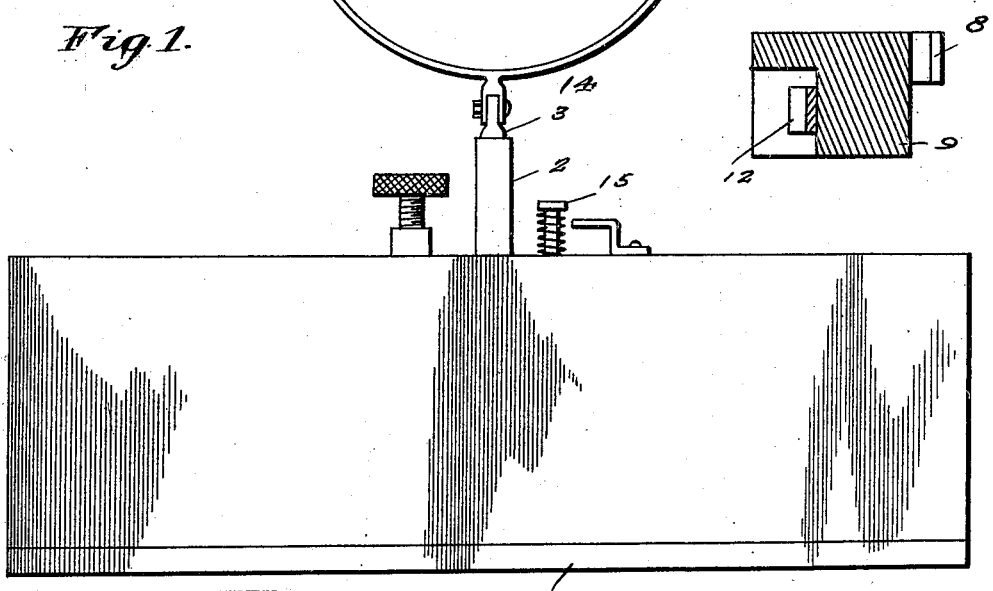
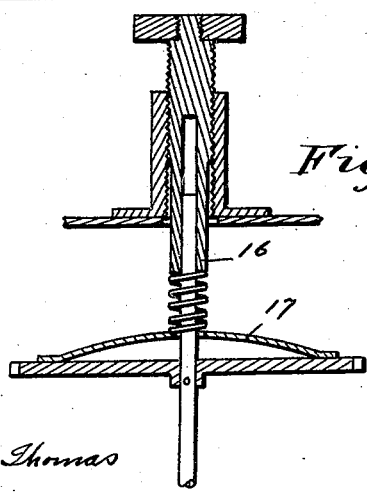
Fig 5.
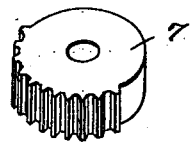
Fig 6.
R. Q. Thomas
L. B. Middleton
WITNESSES
I. J. Ponstein   INVENTOR
BY Victor J. Evans
ATTORNEY

I. J. PONSTEIN.
FAN.
APPLICATION FILED AUG. 24, 1920.

1,418,165.

Patented May 30, 1922.
2 SHEETS—SHEET 2.

R. Q. Thomas
L. B. Middleton

WITNESSES

I. J. Ponstein   INVENTOR

BY Victor J. Evans

ATTORNEY

UNITED STATES PATENT OFFICE.

ISIDORE J. PONSTEIN, OF NEW ORLEANS, LOUISIANA.

FAN.

1,418,165.   Specification of Letters Patent.   Patented May 30, 1922.

Application filed August 24, 1920. Serial No. 405,727.

*To all whom it may concern:*

Be it known that I, ISIDORE J. PONSTEIN, a citizen of the United States, residing at New Orleans, in the parish of Orleans and State of Louisiana, have invented new and useful Improvements in Fans, of which the following is a specification.

This invention relates to a mechanically driven fan for use in causing the circulation of air in a room or the like, the principal object of the invention being to rotate the fan first in one direction and then in the other.

Another object of the invention is to provide means whereby the fan may be easily and quickly removed from the driving means and a larger or smaller fan substituted.

A further object of the invention is to provide a spring motor with means for transmitting its power to a reciprocating member which is used to rotate the fan shaft automatically in opposite directions.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of the complete apparatus.

Figure 4 is a section on line 4—4 of Figure 3.

Figures 5 and 6 are detail views.

Figure 2:
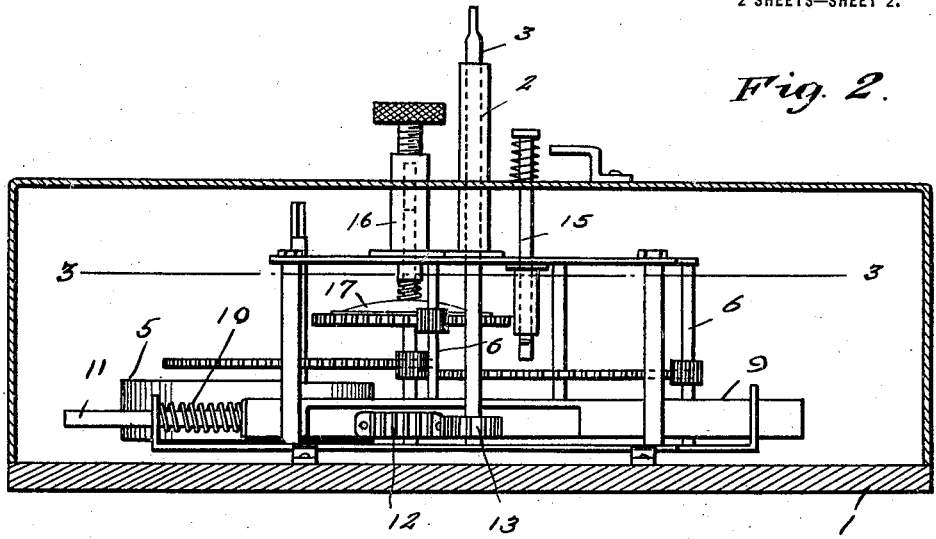
Figure 2 is a longitudinal sectional view.
Figure 3:
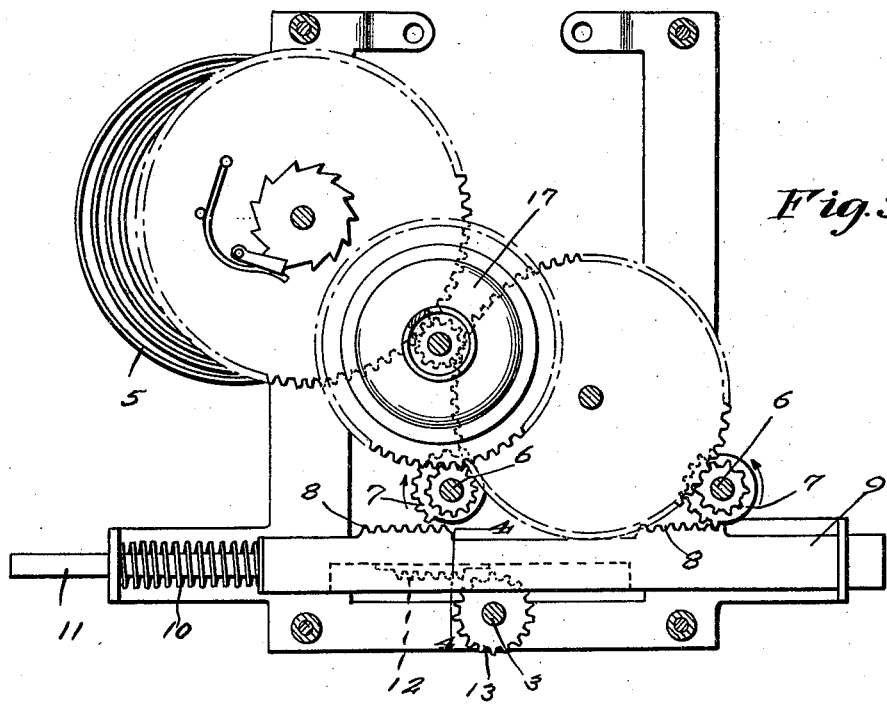
Figure 3 is a horizontal section on line 3—3 of Figure 2.

In these views 1 indicates the base of the device, 2 the tubular stem extending upwardly from the base and enclosing the fan shaft 3 and 4 indicates the fan connected with the upper end of the shaft.

The base contains the actuating means for the shaft and such means consists of the spring motor 5 which is so geared to the two shafts 6 as to drive these shafts in opposite directions. Each of these shafts is provided with a multilated pinion 7 which is adapted to engage with a short rack 8 carried by a reciprocating member 9. These racks and pinions are so arranged that the member will be moved in one direction by one pinion and its rack and then the teeth of this pinion will move out of engagement with the rack and at the same time the teeth of the other pinion will engage its rack and move the reciprocating member in the other direction. By the time the teeth of the second pinion are out of engagement with its rack the teeth of the first pinion come into mesh again with its rack and move the reciprocating member in the other direction. In order to insure the teeth of the second pinion engaging with its rack I provide a spring 10 on the guide rod 11 of the reciprocating member which is compressed on the forward stroke of said member and acts to force the member rearwardly so that the teeth of the second rack will be forced into engagement with the teeth of the second pinion. The reciprocating member also carries a rack 12 which engages with a pinion 13 on the shaft 3. This rack 12 is not long enough to remain in constant engagement with the pinion 13 so that said pinion will be rotated first in one direction and then in the other by the movement of the reciprocating member. I clamp the stem 14 of the fan to the upper ends of shaft 3 so that the fan may be disconnected from the shaft and a new fan substituted.

I also provide a brake 15 for stopping the spring motor whenever desired, this brake being in the form of a spring plunger which is adapted to be moved in engagement with one of the gears to stop the rotation of the parts. I also provide a frictional brake 16 for controlling the speed of the device, this brake being somewhat similar to brake 15 but in this case the spring engages a plate 17 which is carried by one of the gears so that the frictional engagement of the spring with the plate will act to retard the movement of said gear and thus reduce the speed of the rotating parts. The spring of the motor is wound up by any suitable form of key or the like.

It will thus be seen that the single spring of the motor will rotate the two shafts in opposite directions and these two shafts are caused to move the reciprocating member first in one direction and then in the other and the movement of this member is transmitted to the fan shaft so that the fan is rotated first in one direction and then in the other.

By making the fan detachable different sizes of fans may be used so as to increase or decrease the circulation of air in the room.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An apparatus of the character described comprising a base, a hollow stem provided thereon, a motor arranged in said base, a fan shaft passed through said stem, a reciprocating member in the base, a pinion provided on the fan shaft, a rack on the reciprocating member engaging said member, a fan connected with the shaft and means for causing the motor to reciprocate said member, said means consisting of a pair of shafts driven in opposite directions by the motor, mutilated pinions provided on said shafts and racks engaged by said pinions, spring means for resisting the movement of said reciprocating member.

In testimony whereof I affix my signature.

ISIDORE J. PONSTEIN.